358-86. XR 3,504,109 SR

March 31, 1970 D. SPENCER 3,504,109

METERING SYSTEM FOR PAY TV

Filed April 23, 1968 2 Sheets-Sheet 1

INVENTOR.
DONALD SPENCER
BY
Kenway, Jenney & Hildreth
ATTORNEYS

INVENTOR.
DONALD SPENCER
BY Kenway, Jenney & Hildreth
ATTORNEYS

United States Patent Office
3,504,109
Patented Mar. 31, 1970

3,504,109
METERING SYSTEM FOR PAY TV

Donald Spencer, Cambridge, Mass., assignor to Spencer-Kennedy Laboratories, Inc., Boston, Mass., a corporation of Massachusetts Filed Apr. 23, 1968, Ser. No. 723,509
Int. Cl. H04n 1/44
U.S. Cl. 178—5.1 5 Claims

ABSTRACT OF THE DISCLOSURE

A control and metering system for pay television distribution over a cable network. A control and metering unit is located on the cable at a point removed from the receiver. A switch in the control unit controls a set of filters to either receive a pay or free channel at the receiver. This switch also actuates a timing meter in the control unit.

FIELD OF THE INVENTION

This invention relates in general to pay television distribution systems and more particularly to a device for controlling and metering the use of pay television channels in a community antenna television distribution system which also includes free channels.

BACKGROUND OF THE INVENTION

In community antenna television (CATV) systems, the broadcast television signals are received on a community antenna and distributed to the users through cables which are connected into otherwise conventional television receivers. The community antenna television distributor is generally licensed by the appropriate authority and provides signals on the cable corresponding to the usual publicly broadcast channels. These cable signals are supplied for a flat monthly fee, irrespective of the number of channels used or the amount of time the receivers are operated. There have been a number of proposals for incorporating into such a distribution system one or more pay TV channels. Under such proposals, television signals would be provided on channels not corresponding to publicly broadcast frequencies, but rather to television signals which are originated in a scheme generally referred to as pay TV in which the user is required to reimburse the originator of the program on a time of use basis. This arrangement can employ either a coin operated control for a receiver or, perhaps more practically, a tamper proof metering system in which the time of operation of the pay TV channels is metered as a means of generating an appropriate billing. Such systems, of course, require some form of control so that selection of the pay TV channel also generates the signals for the time meter.

In one system which has been proposed in the past, the pay TV signal is electronically scrambled at the point of origin in accordance with a predetermined scrambling pattern. The descrambling code is then transmitted along with the scrambled signals from this channel. A special control is provided at the receiver to descramble the incoming signals on the pay TV channels and operation of this special control actuates a meter or is run by a coin operation. This system has the disadvantage that an extra signal, namely the descrambling code, needs to be transmitted and that the television receiver must be significantly altered internally to incorporate the descrambling control. Such a system requires active elements and an internal modification.

It is therefore a primary object of the present invention to produce a metering and control system for distribution of pay TV channels in which the metering is essentially tamper proof and wherein standard television receivers with little or no modification may be employed.

SUMMARY OF THE INVENTION

Broadly speaking, the control and metering system of this invention includes a control unit which may be physically displaced from the television receiver and interconnected with it only by the signal carrying cable and one other alternating current line. Under these circumstances, the television receiver may be a standard receiver, which has connected to it or included, as its only modification, a selector switch, which is thrown into an "on" position in order to enable the receiver to receive the channel or channels which are pay TV channels. The control unit, which typically might be mounted on a utility pole or other point carrying the TV cable, is usually sealed to prevent tampering with the circuit.

Within the control unit the incoming cable is passed through a filter network before emerging from the unit to be coupled to the receiver. The alternating current line from the receiver is connected to a solenoid, and a timing meter or other timing device is placed across the AC line to this solenoid to indicate the total amount of time during which the solenoid is actuated. The solenoid is positioned with respect to the filter control unit such that the filter passes signals at the frequencies corresponding to the pay TV channels only when the solenoid is actuated. Thus, either no modification or, at most, a single modification to the standard TV receiver, together with the control box provides for an essentially tamper proof control and monitoring system for the pay TV channels on the cable transmission system.

DESCRIPTION OF PREFERRED EMBODIMENTS

Figure 1:
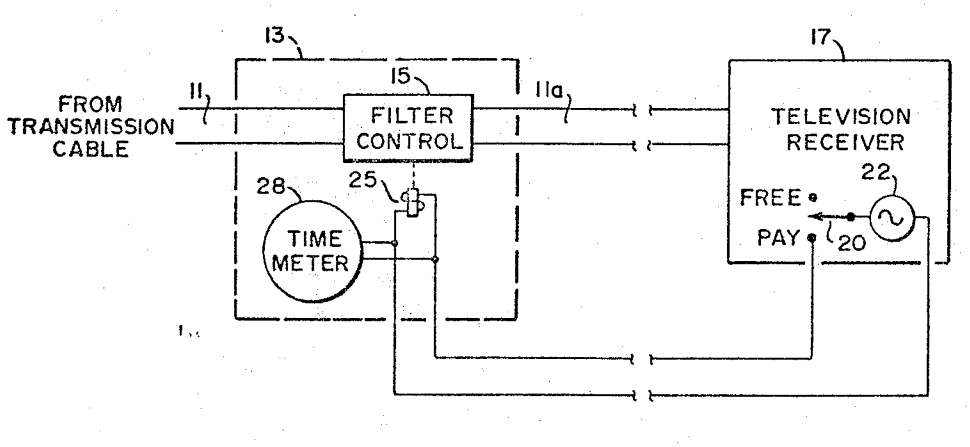
FIG. 1 is an illustration generally in block diagrammatic form of a control and metering system in accordance with the principles of this invention.

With reference now to FIG. 1, there is illustrated a control and metering system in accordance with the principles of this invention. The transmission cable 11 enters a control and metering unit 13 where it is passed through a filter control unit 15 and thereafter emerges to be coupled to the normal television receiver 17. The receiver 17 has a switch 20 which is in series with an alternating current voltage source 22 to connect or not connect this source to a solenoid 25 in the control and metering unit 13. Also coupled directly across this alternating current supplied to the solenoid 25 is a time meter 28, which may take any conventional form for accumulating the total amount of time that the current is supplied to this solenoid. Typically, this might be a conventional watt hour meter. The control and metering unit 13 is normally included in a locked case of some description, so that access to it can be limited. While the switch 20 is shown as an internal modification to the receiver 17, this switch can, of course, be wholly external to the receiver.

In operation, the person operating the receiver 17 may place the switch 20 in the pay position, thereby actuating solenoid 25. While this solenoid 25 is actuated the filter control unit 15 is placed in condition so that it passes frequencies corresponding to the pay TV channels. In some instances, these frequencies will be only the high band frequencies, in others only the low band frequencies, and in still others selected band frequencies.

Figure 2:
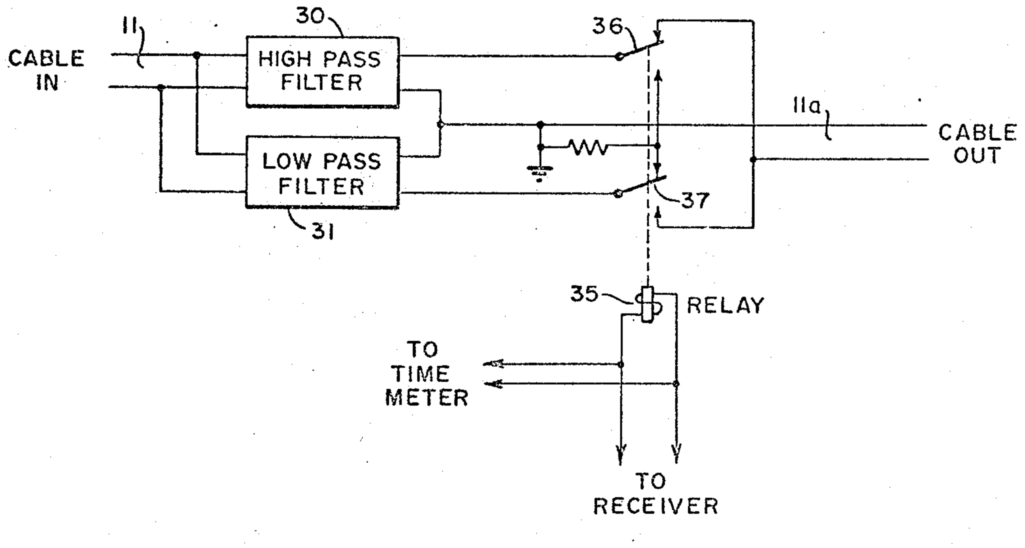
FIG. 2 is an illustration in block diagrammatic form of a portion of a system constructed in accordance with the principles of this invention.

Referring now to FIG. 2, there is illustrated a particular configuration of switching and filters, suitable for use with a system in which the high frequency carriers are the non-pay TV channels, whereas the low frequency carriers are the pay TV channels. In this configuration, the cable 11 is coupled both to a high pass filter 30 and a low pass filter 31. The output leads from the filters 30 and 31 are connected through the contact points of a double pole, double throw relay 35 to the output cable 11*a*. The arms 36 and 37 of relay 35 are in a position, when the relay is not energized, so that the output from the high pass filter 30 is connected directly to the output cable 11*a* and the output from the low pass filter 31 is grounded. Upon energization of relay 35 the switch arms 36 and 37 are moved to the other contact points so that the output from the high pass filter 30 is grounded, while the output from the low pass filter 31 is now connected directly to the output cable 11*a*. It is in this latter condition that the pay TV channels are connected to the receiver and hence under these conditions a timing meter (not shown) is also actuated.

Figure 3:
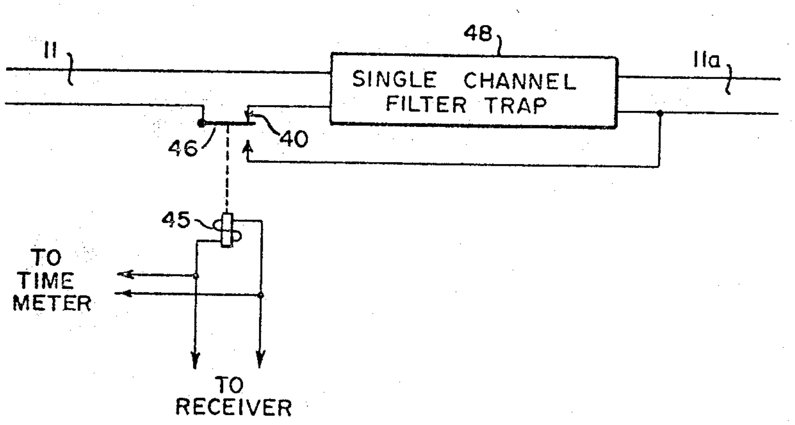
FIG. 3 is an illustration in block diagrammatic form of an alternative embodiment of a portion of this system in accordance with the principles of this invention.

In FIG. 3, there is illustrated a configuration of the control means suitable for use in a system in which the pay TV channel is in a specific band of frequency. In the system illustrated in FIG. 3, the signal from the input cable 11 is normally coupled through the closed contacts 40 of relay 45 to a single channel filter trap 48 and thence to the output cable 11*a*. Under these circumstances, all of the signals on the cable 11, except those within the narrow band trapped out by the filter trap 48, are passed to the output cable and thence to the receiver. Upon actuation of the pay TV channel at the receiver, however, an energizing signal is sent to relay 45 thereby providing a signal path around the single channel filter trap 48, allowing signals at that carrier frequency to be transmitted to the receiver. A meter, of course, monitors the amount of time during which the relay 45 is energized.

Figure 4:
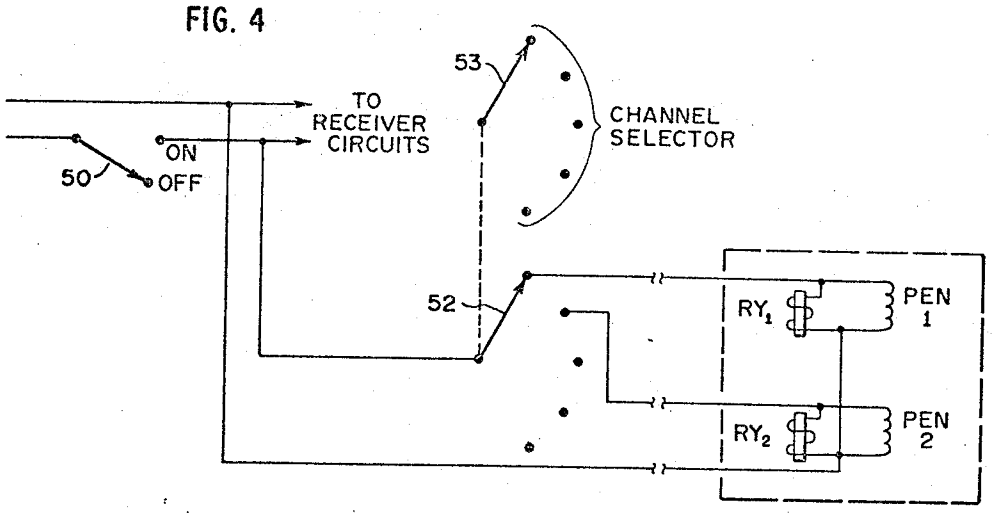
FIG. 4 is an illustration in schematic form of a portion of this system constructed in accordance with the principles of this invention.

In some organizations of pay TV, it will be required to have an output indication of which of several pay TV channels are being used and of the total use time of each one of these individual channels. Such a system is shown in FIG. 4. In this system, a modification to the receiver is made whereby a second switch is placed in parallel with the channel selector switch in the receiver itself. The circuitry is arranged such that whenever the off-on switch 50 which supplies the basic power to the receiver is on, AC power is connected through the multiposition switch 52 which is in parallel with the channel selector switch 53. Depending upon the channel selected, this AC signal will be transferred up to the control unit to one or the other of a series of relays $RY_1$, $RY_2$ etc. Each relay actuates an individual band pass filter corresponding to the particular pay TV channel and, upon energization of the relay a corresponding pen in a multipen recorder is also actuated to provide a time record for each individual channel.

Having described the invention various modifications and improvements will now occur to those skilled in the art and the invention should be construed as limited only by the spirit and scope of the appended claims.

What is claimed is:

1. Apparatus for controlling and metering the time an individual television receiver is operated at a selected channel frequency to receive signals transmitted over a cable from a source remote from said receiver comprising:

a selector unit associated with said receiver and including signal generating means for providing an actuating signal, a selector switch for activating said signal generating means, and a line for connecting said signal generating means to a control unit;

a control unit coupled to said cable between said source and said receiver, including high pass filter means;

low pass filter means;

switching means for selectively coupling each of said filter means between said cable and said receiver;

relay means operative in response to said actuating signal to control said switching means; and metering means responsive to the actuation of said relay means to provide an output indication related to the time period said relay means is actuated.

2. Apparatus in accordance with claim 1 wherein said television receiver includes a plurality of channels, any one of which may be selected, and said relay means includes a plurality of relays, each of said relays corresponding to one of said selectable channels, each of said relay means controlling said switching means to couple and decouple a filter in said filter means for transmitting only signals corresponding to the carrier frequency of the associated channel; and wherein said metering means provides a plurality of output indications, separate output indications being indicated for the time of actuation of each of said relay means.

3. Apparatus in accordance with claim 1 wherein said switching means is operative in the absence of said actuating signal to couple said high pass filter means between said cable and said receiver and to couple said low pass filter means to ground, and operative in response to said actuating signal to couple said low pass filter means between said cable and said receiver and to couple said high pass filter means to ground.

4. Apparatus in accordance with claim 3 wherein said switching means is a double pole double throw switch.

5. Apparatus in accordance with claim 3 wherein said signal generating means is an alternating current voltage source.

References Cited

UNITED STATES PATENTS

| | | | |
|---|---|---|---|
| 3,157,737 | 11/1964 | Schlafly | 178—5.1 X |
| 3,188,384 | 6/1965 | Townsend | 178—5.1 X |

RICHARD A. FARLEY, Primary Examiner

M. F. HUBLER, Assistant Examiner